(12) United States Patent
Dickinson et al.

(10) Patent No.: US 11,603,050 B2
(45) Date of Patent: Mar. 14, 2023

(54) SPRING FASTENER

(71) Applicant: Termax LLC, Lake Zurich, IL (US)

(72) Inventors: Daniel James Dickinson, Lincolnshire, IL (US); Michael Walter Smith, Lake Zurich, IL (US)

(73) Assignee: Termax Company, Lake Zurich, IL (US)

( * ) Notice: Subject to any disclaimer, the term of this patent is extended or adjusted under 35 U.S.C. 154(b) by 6 days.

(21) Appl. No.: 14/147,522

(22) Filed: Jan. 4, 2014

(65) Prior Publication Data

US 2016/0375840 A1    Dec. 29, 2016

Related U.S. Application Data

(63) Continuation-in-part of application No. 11/564,840, filed on Nov. 29, 2006, now abandoned.

(51) Int. Cl.
| | | |
|---|---|---|
| *F16B 21/07* | (2006.01) | |
| *B60R 13/00* | (2006.01) | |
| *F16B 2/24* | (2006.01) | |
| *B60R 13/02* | (2006.01) | |
| *F16B 5/06* | (2006.01) | |

(52) U.S. Cl.
CPC .............. *B60R 13/00* (2013.01); *B60R 13/02* (2013.01); *B60R 13/0212* (2013.01); *F16B 2/243* (2013.01); *F16B 5/065* (2013.01); *F16B 5/0657* (2013.01); *F16B 21/075* (2013.01); *Y10T 24/304* (2015.01); *Y10T 24/307* (2015.01)

(58) Field of Classification Search
CPC .... Y10T 24/307; Y10T 24/304; F16B 21/075; F16B 21/076
See application file for complete search history.

(56) References Cited

U.S. PATENT DOCUMENTS

| | | | | |
|---|---|---|---|---|
| 2,175,814 A | * | 10/1939 | Pender | F16B 5/125 24/295 |
| 2,198,186 A | * | 4/1940 | Tinnerman | F16B 5/125 24/294 |
| 2,223,622 A | * | 12/1940 | Kost | F16B 5/125 24/293 |
| 2,332,656 A | | 7/1943 | Murphy | |
| 2,329,688 A | | 9/1943 | Bedford | |

(Continued)

FOREIGN PATENT DOCUMENTS

WO      98/48179      10/1998

*Primary Examiner* — Flemming Saether

(57) ABSTRACT

According to one embodiment, a fastener comprises a first side and a second side opposite the first side. The first side is connected to the second side thereby forming a U-shaped structure. The fastener further comprises a bottom portion wherein the first side and the second side are connected, and a top portion opposite the bottom portion. The first side comprises a first engagement spring. The first engagement spring is connected to the first side in the vicinity of the bottom portion. The engagement springs have inward facing gussets connected to the bottom portion. The second side comprises a second engagement spring. The second engagement spring is connected to the second side in the vicinity of the bottom portion. A cavity is formed between the first side and the second side as will be described below. The engagement springs include an engagement region operable to adapt to variations or movement of a slot.

24 Claims, 8 Drawing Sheets

(56) References Cited

U.S. PATENT DOCUMENTS

| | | | | |
|---|---|---|---|---|
| 2,345,004 A | * | 3/1944 | Place | F16B 5/0642 128/200.11 |
| 2,424,757 A | | 7/1947 | Klumpp | |
| 2,499,637 A | * | 3/1950 | Flora | B22C 21/14 24/295 |
| 2,607,971 A | | 8/1952 | Bedford | |
| 2,775,010 A | * | 12/1956 | Bedford, Jr. | B60R 13/0206 24/581.11 |
| 2,825,948 A | | 3/1958 | Parkin | |
| 2,863,195 A | * | 12/1958 | Elms | F16B 5/125 24/293 |
| 3,336,828 A | * | 8/1967 | Granger | F16B 37/067 411/432 |
| 3,525,129 A | | 8/1970 | Holton | |
| 3,673,643 A | | 7/1972 | Kindell | |
| 3,673,646 A | | 7/1972 | Kindell | |
| 3,864,789 A | | 2/1975 | Leitner | |
| 4,043,579 A | | 8/1977 | Meyer | |
| 4,133,246 A | | 1/1979 | Small | |
| 4,245,652 A | | 1/1981 | Kelly | |
| 4,431,355 A | | 2/1984 | Jünemann | |
| 4,595,325 A | | 6/1986 | Moran | |
| 4,609,170 A | | 9/1986 | Schnabl | |
| 4,630,338 A | * | 12/1986 | Osterland | F16B 5/123 24/293 |
| 4,644,612 A | * | 2/1987 | Osterland | F16B 5/065 24/289 |
| 4,683,622 A | | 8/1987 | Oehlke | |
| 4,701,984 A | | 10/1987 | Wyckoff | |
| 4,712,341 A | | 12/1987 | Harris, Jr. et al. | |
| 4,792,475 A | | 12/1988 | Bien | |
| 4,981,310 A | | 1/1991 | Belisaire | |
| 5,011,355 A | * | 4/1991 | Motoshige | F16B 5/0642 411/349 |
| 5,092,550 A | | 3/1992 | Bettini | |
| 5,095,592 A | | 3/1992 | Doerfling | |
| 5,129,768 A | | 7/1992 | Hoyle | |
| 5,263,233 A | | 11/1993 | Kim | |
| 5,314,280 A | | 5/1994 | Gagliardi | |
| 5,367,751 A | | 11/1994 | DeWitt | |
| 5,373,611 A | | 12/1994 | Murata | |
| 5,442,789 A | | 8/1995 | Baker | |
| 5,542,158 A | | 8/1996 | Groanau | |
| 5,636,891 A | * | 6/1997 | Van Order | B60N 3/026 224/313 |
| 5,759,004 A | * | 6/1998 | Kuffel | F16B 21/086 24/295 |
| 5,887,319 A | | 3/1999 | Smith | |
| 5,919,019 A | | 7/1999 | Fischer | |
| 5,987,714 A | | 11/1999 | Smith | |
| 6,007,136 A | * | 12/1999 | Zittwitz | B60J 3/0221 24/295 |
| 6,074,150 A | | 7/2000 | Shinozaki | |
| 6,141,837 A | | 11/2000 | Wisniewski | |
| 6,203,240 B1 | | 3/2001 | Hironaka | |
| 6,279,207 B1 | | 8/2001 | Vassiliou | |
| 6,353,981 B1 | | 3/2002 | Smith | |
| 6,381,811 B2 | | 5/2002 | Smith | |
| 6,453,522 B1 | | 9/2002 | Magarino | |
| 6,497,011 B2 | | 12/2002 | Smith | |
| 6,517,302 B2 | | 2/2003 | Lee | |
| 6,527,471 B2 | | 3/2003 | Smith | |
| 6,629,809 B2 | | 10/2003 | Vassiliou | |
| 6,644,713 B2 | | 11/2003 | Abejon | |
| 6,648,542 B2 | | 11/2003 | Smith | |
| 6,691,380 B2 | | 2/2004 | Vassiliou | |
| 6,718,599 B2 | | 4/2004 | Dickinson | |
| 6,745,440 B2 | | 6/2004 | Vassiliou | |
| 6,796,006 B2 | | 9/2004 | Hansen | |
| 6,868,588 B2 | | 3/2005 | Dickinson | |
| 6,976,292 B2 | | 12/2005 | MacPherson | |
| 7,428,770 B2 | | 9/2008 | Dickenson et al. | |
| 7,640,634 B2 | | 1/2010 | Crawford | |
| 7,784,159 B2 | | 8/2010 | Dinkinson | |
| 7,874,775 B2 | * | 1/2011 | Hullmann | B60R 11/00 24/295 |
| 8,469,438 B2 | * | 6/2013 | Mazur | B60R 13/0206 24/293 |
| 2001/0032377 A1 | | 10/2001 | Lubera | |
| 2002/0100146 A1 | | 8/2002 | Ko | |
| 2002/0167187 A1 | | 11/2002 | Murar | |
| 2004/0083582 A1 | | 6/2004 | Tisol, Jr. | |
| 2005/0236861 A1 | | 10/2005 | Slobodecki et al. | |
| 2006/0117535 A1 | | 6/2006 | Fraser et al. | |

\* cited by examiner

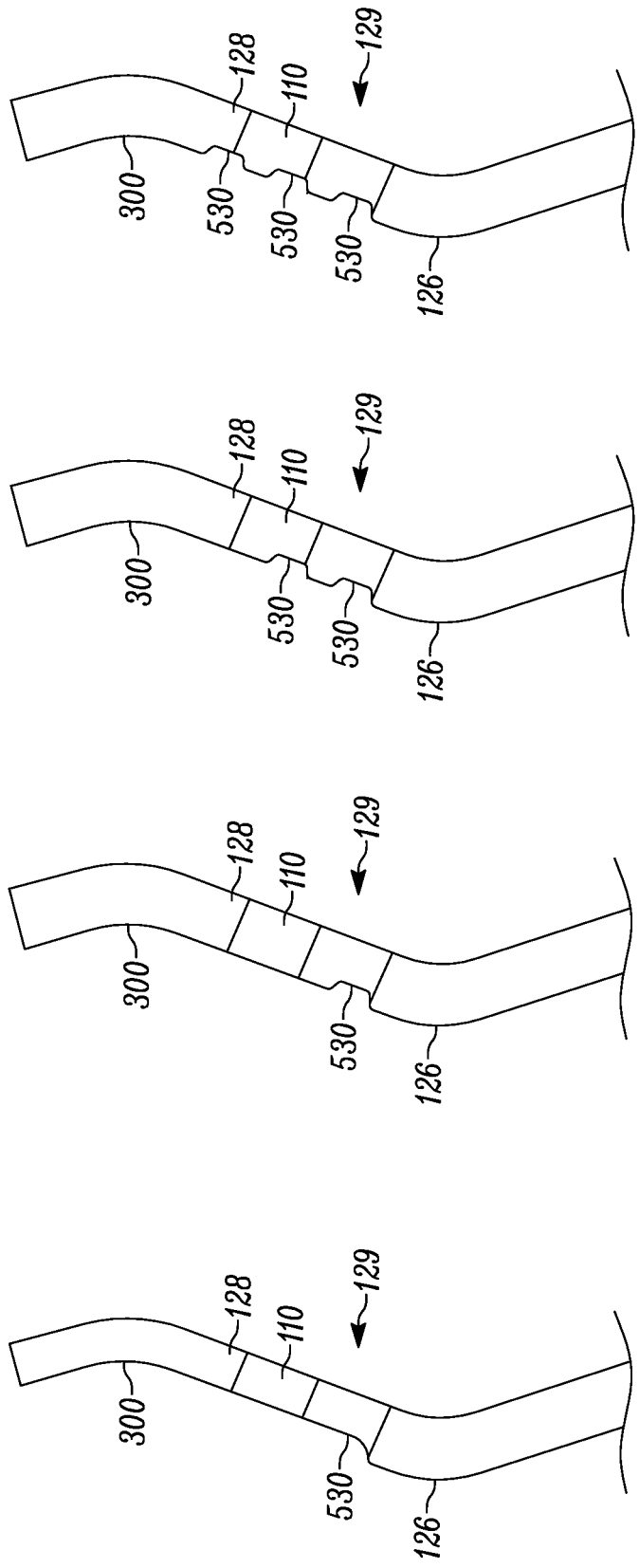

SPRING FASTENER

RELATED APPLICATIONS

This application is a continuation in part application of co-pending application Ser. No. 13/476,957 entitled "Spring fastener with highly improved lever/angle pulling force" filed on May 21, 2012, which is a continuation in part application of U.S. Pat. No. 7,188,392 entitled "Spring fastener with highly improved lever/angle pulling force", filed on Sep. 16, 2004, which claims priority from provisional application 60/520,807 filed on Nov. 17, 2003 and owned by the instant assignee.

FIELD OF THE ART

This application relates to fasteners. This application also relates to an assembly as connected to each other through the fastener, as well as vehicles comprising such assemblies.

BACKGROUND

A number of fasteners have been used for securing one object on another object, as for example, fastening panels such as body panels and automobile interior trim piece panels to the chassis of a vehicle. As used herein, a body panel refers to for example, any interior or exterior body panel on a vehicle, a plastic interior trim piece, headliner or any interior trim piece. Additionally, the panel may be any suitable exterior body panel, such as a fender, bumper, quarter panel, door panel or other suitable body part. The chassis of the vehicle may include any substrate, plate, body panel, structural framework, chassis component or subcomponent, wall or any suitable object.

However, these fasteners have a rather high ratio of insertion force to removal force. In other words, they require considerable force to be inserted into a slot as a result of the requisite removal resistance in order to be removed from the slot. Some conventional fastener devices instead provide approximately relatively equal levels of insertion and extraction force. Since the extraction force required is high for these fasteners, the insertion force is also high, or even higher than the extraction force. This is not ergonomic, as operators are more susceptible to repetitive stress syndrome and other ailments, resulting in reduced productivity, lower reliability and higher labor costs. In addition these fasteners suffer from rather inferior Lever/Angle Pulling force. Lever/Angle pulling force is the force required to separate one part from another part connected with a fastener by pulling said parts apart, not straight away from each other, but sideways from each other, as will be described in more detail herein below.

Further, conventional fasteners typically do not adequately secure the panel to the vehicle chassis having sheet metal with different curvature or thicknesses throughout. Also, conventional fasteners are not suitable under a variety of environmental conditions, such as in the presence of vibration at various levels of amplitude and frequency. For example, the fastener device should prevent or minimize the amount of buzzing, rattling or any other type of noise that may cause attention to the occupants of the vehicle or otherwise weaken the attachment. Also, conventional fasteners do not adequately accommodate various levels of production tolerances. For example, tolerances include various dimensions amongst, for example, the fit and distance between body panels and the vehicle chassis. Thus, conventional fastener devices typically do not adequately fasten to a range of sheet metal thicknesses and do not minimize or eliminate buzzing and rattling and do not sufficiently accommodate variations in production tolerances.

A fastener has been disclosed in U.S. Pat. No. 6,718,599 B2, which is incorporated herein by reference, characterized by ergonomically balanced removal to insertion force ratio. However, even in this case, the Lever/Angle pulling force is relatively low.

Examples of other state of the art fasteners are disclosed in U.S. Pat. No. 6,381,811 (Smith et al.), U.S. Pat. Nos. 6,353,981, 6,074,150 (Shinozaki et al.), U.S. Pat. No. 5,987,714 (Smith); U.S. Pat. No. 5,887,319 (Smith); U.S. Pat. No. 5,542,158 (Gronau et al.); U.S. Pat. No. 5,422,789 (Fisher et al.), U.S. Pat. No. 5,373,611 (Murata); U.S. Pat. No. 5,314,280 (Gagliardi); U.S. Pat. No. 5,095,592 (Doerfling); U.S. Pat. No. 4,701,984 (Wyckoff), U.S. Pat. No. 4,792,475 (Bien); U.S. Pat. No. 4,683,622 (Ohelke); U.S. Pat. No. 4,609,170 (Schnabl); U.S. Pat. No. 4,245,652 (Kelly et al.); U.S. Pat. No. 3,864,789 (Leitner); U.S. Pat. No. 3,673,643 (Kindell); U.S. Pat. No. 3,525,129 (Holton); U.S. Pat. No. 2,825,948 (Parkin); U.S. Pat. No. 2,607,971 (Bedford, Jr.); U.S. Pat. No. 2,542,883 (Tinnerman); U.S. Pat. No. 2,329,688 (Bedford, Jr.); U.S. Pat. No. 2,322,656 (Murphy), among others.

U.S. Pat. No. 5,919,019 (Fisher) provides fasteners which can only be permanently installed into a slot; they can only be inserted but not extracted without damage to parts of the fastener. The major engagement is performed by spring strips, while frictional portions of the fastener pass through the slot with at most slight compression, and immediately after the insertion of the fastener they are located in slightly spaced or barely contacting relation with the edges of the slot. They are only activated for engagement after the insertion of a bolt into a hole at the base plate. The distance of the frictional portions away from the edges of the slot by Fisher, during insertion and before use of the bolt, affects the insertion force.

U.S. Pat. No. 6,141,837 (Wisniewski) describes a spring fastener comprising bulbous and outwardly projecting portions, which assist in preventing withdrawal of the clip and associated molding from an aperture of a vehicle frame.

U.S. Pat. No. 6,203,240 B1 (Hironaka et al.), U.S. Pat. No. 5,129,768 (Hoyle et al.), U.S. Pat. No. 5,092,550 (Bettini), U.S. Pat. No. 4,981,310 (Belissaire), U.S. Pat. No. 4,712,341 (Harris, Jr. et al.), U.S. Pat. No. 4,595,325 (Moran et al.), U.S. Pat. No. 4,431,355 (Junemann), U.S. Pat. No. 4,133,246 (Small), and U.S. Pat. No. 2,424,757 (F. Klump, Jr.) are directed to plastic or metal fasteners which are designed to be just inserted into the slot of a panel, but not extracted without damage to the fastener. Extraction is only possible from the front side; the side from which the fastener is inserted into the panel, since the back part of the panel is not reachable.

SUMMARY

According to one embodiment, a fastener comprises a first side and a second side opposite the first side. The first side is connected to the second side thereby forming a U-shaped structure. The fastener further comprises a bottom portion wherein the first side and the second side are connected, and a top portion opposite the bottom portion. The first side comprises a first engagement spring. The first engagement spring is connected to the first side in the vicinity of the bottom portion. The engagement springs have inward facing gussets connected to the bottom portion. The second side comprises a second engagement spring. The second engagement spring is connected to the second side in the vicinity of the bottom portion. A cavity is formed between the first side and the second side as will be described below. The engagement springs include an engagement region operable to adapt to variations or movement of a slot.

As described above, the first and second springs have engagement regions to engage the slot of a part such as a body panel as shown in FIGS. 1-4 and 14-16 and as described in more detail below. Alternatively, the fastener may have engagement regions on both the first and second springs as well as the first and second sides and thus the fastener engages the slot in more than two engagement regions, such as six engagement regions as shown in FIGS. 6, 7 and 8 and described in more detail below. The fastener attaches to the chassis of an automobile with a relatively low level of insertion force while providing a high level of extraction force suitable to maintain attachment of the panel to the chassis.

In contrast to known fasteners, the fastener clip has a high level of extraction force yet securely and relatively easily facilitates attachment of a body panel, such as an interior or exterior body panel with the first engagement structure such as the vehicle chassis. The fastener clip is suitable for use in heavy duty applications such as door panel mounting, and pull-handle fasteners headliners. The engagement springs have an engagement region, size, such as a width, length, thickness and pivot point to provide very high extraction force levels while the insertion force level is relatively low.

According to one embodiment, an increase in Lever/Angle pulling (extraction) force is attained by forming hindrance portions on the engagement regions. Additionally, an inward facing gusset on the engagement springs prevent the sides from compressing toward each other. According to another embodiment, the extraction force may be increased by having gussets and/or a side-cut section, especially at least partially bent outwardly, disposed in the spring fastener, as will be described in more detail herein below. Outwardly for example means away from the fastener.

According to one embodiment, each of the first and second engagement springs comprise a peak, a free end in the vicinity of the top portion, and an engagement region between the peak and the front end. According to one embodiment, however, each spring has two side-cut sections, one opposite to the other.

The side-cut sections or notches have an upper edge and a lower edge. According to one embodiment, that at least one of the lower edges or all lower edges are at least partially bent outwardly.

Further, the same fastener clip may be used with different sheet metal thicknesses and curvatures. For example, a vehicle may have different sheet metal thicknesses at various parts of the vehicle. The range of slot thicknesses varies continuously from a minimum thickness to a maximum thickness. For example, the range of thickness may be 0.25 mm or less to 6.0 mm or more. The fastener clip is operative for insertion into the slot of a first engagement structure, such as a vehicle chassis. Since the fastener clip adapts automatically to different sheet metal thicknesses and curvatures, the same fastener clip may be used throughout the vehicle thus eliminating the need for specific fastener clips for specific slot thicknesses.

The engagement portion adapts to variations, curvature or movement of slot, different sheet metal thicknesses and variations in the thickness of various portions of the vehicle chassis and variations in body panel distances and thicknesses. The ability of the engagement portion to adapt to these effects, allows the fastener to maintain a high level of extraction force relative to the insertion force.

For example, during engagement the engagement portion continuously adapts to variations in thickness, curvature and dimensions of the vehicle chassis and/or in the body panel and other variations. According to one embodiment, each spring independently engages the slot of the vehicle chassis in a continuous rather than discrete manner. Further, each engagement region adapts to changes, such as chassis flexing and vibrations of a wide range of amplitudes and frequencies, and other conditions.

The engagement portion, along with an optional slot retaining tab on each engagement spring, permits relatively easy insertion of the fastener clip into a slot formed within the vehicle chassis while preventing the end of the springs from passing through the slot. Thus, the slot retaining tabs keep the engagement region of the springs engaged in the slot which provide a relatively high level of extraction force from the vehicle chassis. Assembly of the body panel onto the vehicle chassis such as a door frame requires a relatively low level of insertion force compared to the extraction force, and as a result provides many ergonomic advantages. For example, the relatively low level of insertion force is particularly advantageous for assembly line operators who repetitively insert body panels onto the vehicle chassis. The relatively low level of insertion force required for inserting the body panel into the vehicle chassis may result in fewer injuries to the assembly workers, including injuries related to repetitive stress syndrome.

By eliminating conventional fasteners and screws for fastening to the door frame, assembly of the door panel to the door with the fastener significantly reduces assembly and servicing time and cost. Further, by eliminating multiple fasteners for different sheet metal thicknesses, confusion during assembly is reduced since the same type fastener may be used for all slots. Thus, an assembly worker need not worry about selecting the wrong fastener for different slot thicknesses.

The fastener clip dampens vibrations and thus eliminates or substantially reduces buzz, squeak and rattles. The fastener clip continuously adapts to changes in environmental conditions such as vehicle flexing, vibration and thermal expansion. For example, the fastener clip may adapt to changes in thermal expansion, especially due to the differences in thermal expansion rates between dissimilar metals with respect to the vehicle chassis components and/or between plastic components such as the interior trim panels attached to the metal vehicle chassis. The fastener clip may also fasten to plastic and/or metal engagement structures. The fastener clip and sheet metal portion clip may be made of anti-corrosive material such as plastic or treated metal to provide long reliable service life.

The relatively high level of extraction force, characteristic of the fastener clip, securely attaches the body panel, such as an interior trim piece or door panel, to the vehicle chassis such as a door. Further, the fastener clip continuously adapts to changes in environmental conditions such as vehicle flexing, vibration and thermal expansion. For example, the fastener clip may adapt to changes in thermal expansion, especially due to the differences in thermal expansion rates between dissimilar metals or metal to plastic with respect to the vehicle chassis components and/or between plastic components such as the interior trim panels attached to the metal vehicle chassis.

Yet another advantage is that the fastener clip is relatively easy to manufacture using relatively inexpensive manufacturing processes and materials. The use of the fastener clip decreases production costs, increases worker productivity and efficiency and decreases overall vehicle assembly costs. The fastener clip securely attaches any suitable body panel to the vehicle chassis, such that the fastener clip improves reliability both in the short term and in the long term, while further improving vehicle safety and quality.

According to another embodiment, a spring fastener engages the rib of a first part, such as a plastic panel for example. The spring fastener is also suitable to be engaged reversibly in a slot of second part, such as a metal sheet or the frame of a car for example.

According to one embodiment, the fastener comprises a hindrance portion within the engagement region. The spring fastener may further comprise for example a recess within the engagement region, in the vicinity of the top end.

The hindrance portion may include any suitable structure, which hinders to a desired degree the removal of the spring fastener from the slot described above. According to one embodiment, the said hindrance portion comprises one structure selected from ripple, side rib, upward solid bent extension parallel to the peak and the optional recess, knurled region, bent teeth, each having a depth, a bump or bulbous formation, and a combination thereof.

According to one embodiment, there may be a single ripple in the vicinity of the peak or the ripple may have a back side with a curvature of a gradually decreasing slope. Preferably, the gradually decreasing slope has the shape of an arc in the range of 50-70 degrees with a radius in the range of 0.03-0.05 mm.

More details regarding configurations of engagement regions are described in U.S. Pat. No. 6,718,599, filed Jun. 7, 2002, both of which are incorporated herein by reference.

According to one embodiment the spring fastener further comprises gussets on the inside part of the sides, facing each. The gussets may be first barbs and second barbs being cut portions of the respective first and second side of the spring fastener, originating from the vicinity of the top portion of said spring fastener and directed toward the bottom portion the spring fastener, the first barbs and the second barbs comprising respective first back sections and first front sections, the first sections being bent portions of the first back sections, and second back sections and second front sections, the second front sections being bent portions of the second back sections.

The barbs are selected from a group consisting essentially of:

first barbs being outer barbs and second barbs being inner barbs;

first barbs being outside outer barbs and second barbs being inside outer barbs; and first barbs being inner barbs and second barbs being inner barbs.

It is preferable that the barbs which are cut from their respective side, are flexible, and bent in the vicinity of their respective front end as described for example in U.S. Pat. No. 6,279,207 B1, and U.S. Pat. No. 6,691,380 B2 which are incorporated herein by reference, and more particularly in FIG. 1A of said patent, with an angle of bent in the range of 5-25 degrees.

The barbs are considered to be flexible if according to one embodiment, they do not cause the width W3 (FIG. 1B) to increase more than 30%, or alternatively 20%, or alternatively 10%, when the rib 46 is inserted into the cavity 19 of the fastener 10 (FIG. 4A), and provided that the first object 46 is adequately hard to hinder the barbs 36 from substantially digging into it.

Regarding the outside outer barbs, according to one embodiment, the front points are at a distance from the second side smaller than the thickness of the material from which the spring fastener was made. This is to avoid interconnection of the fasteners, when said fasteners are stored in bulk.

The barbs may have variable width along their length, or they may have substantially the same width along their length. Further, the front points of the barbs may be toothed.

More details regarding bent barbs are also described in U.S. Pat. Nos. 6,279,207 B1 and 6,691,380 B2, both of which are incorporated herein by reference.

The spring fastener may further comprise a molded elastic body at least under the top portion of said spring fastener for sealing purposes. Such arrangements are disclosed in U.S. Pat. No. 6,353,981 B1, which is incorporated herein by reference. Other sealing arrangements are also included, as described for example in U.S. Pat. No. 6,527,471 B2, which is also incorporated herein by reference.

In another embodiment, the spring fastener may further comprise:

an elastic body comprised of at least a gasket, the gasket extending away from the cavity in the vicinity of the top portion of the fastener and enclosing at least partially the cavity; and a casing surrounding at least partially the spring fastener under the top portion, except at least the engagement section of each engagement spring, the casing also at least partially surrounding the cavity and such portion of the elastic body which at least partially encloses the cavity;

wherein the casing has lower ultimate elongation, higher Shore hardness, and higher shear strength than the elastic body. Thus, preferably the casing is substantially non-elastic.

Such arrangements are disclosed in U.S. Pat. Nos. 6,381, 811 B2, 6,497,011 B2, 6,527,471 B2, and 6,648,542 B2, all of which are incorporated herein by reference.

According to one embodiment the fasteners described above and their equivalents may be used in any assembly in which the first part and/or the second part are connected with the fastener, as well as in any vehicle comprising such an assembly or such a fastener or its equivalents.

DESCRIPTION OF THE DRAWINGS

The reader's understanding of practical implementation of embodiments will be enhanced by reference to the following detailed description taken in conjunction with perusal of the drawing figures, wherein:

FIG. 5B illustrates a detailed view of the engagement portion of the fastener according to another embodiment.

FIG. 5C illustrates a detailed view of the engagement portion of the fastener according to another embodiment.

FIG. 5D illustrates a detailed view of the engagement portion of the fastener according to another embodiment.

FIG. 5E illustrates a detailed view of the engagement portion of the fastener according to another embodiment.

DETAILED DESCRIPTION

Figure 1:
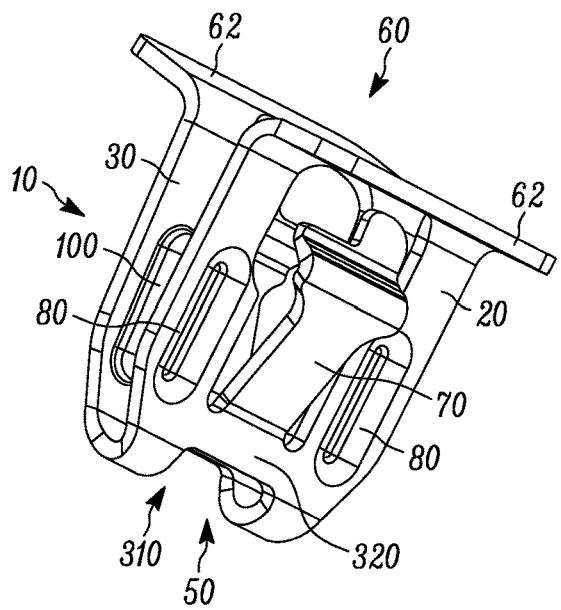
FIG. 1 illustrates a perspective view of a fastener according to an embodiment.
Figure 1A:
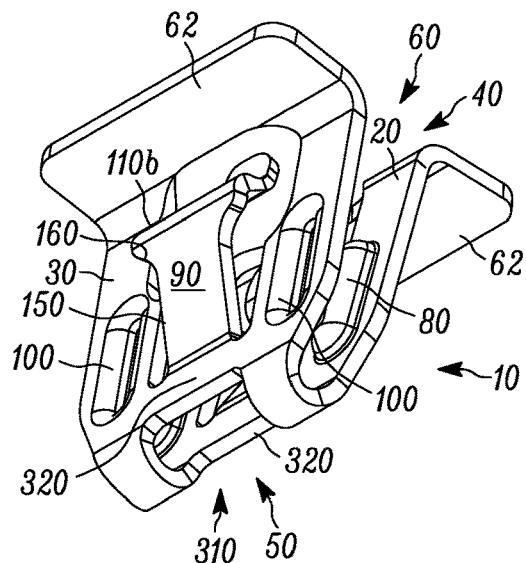
FIG. 1A illustrates another perspective view of the fastener.

FIGS. 1 and 1A are perspective views of a fastener 10 according to one embodiment. The fastener clip 10 comprises a first side 20 and a second side 30 opposite the first side 20. The first side 20 is connected to the second side 30 thereby forming a U-shaped structure. According to one embodiment, a cavity 40 is formed between the first side 20 and the second side 30. The fastener clip 10 further comprises a bottom portion 50 wherein the first side 20 and the second side 30 are connected, and a top portion 60 on the fastener 10 opposite the bottom portion 50. According to one embodiment, each side 20, 30 has feet 62 pointing away from each other at the top portion 60 of the fastener 10.

Figure 2:
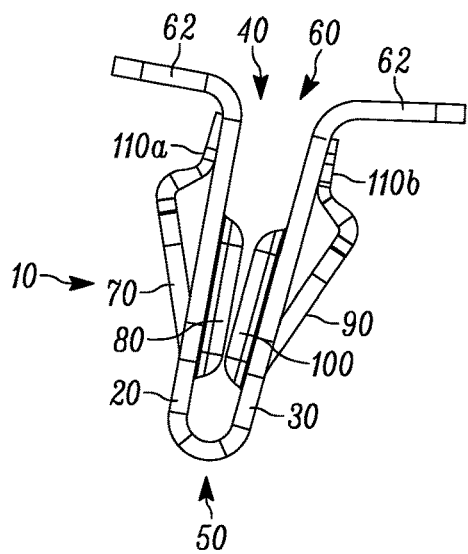
FIG. 2 illustrates side view of the fastener.
Figure 3:
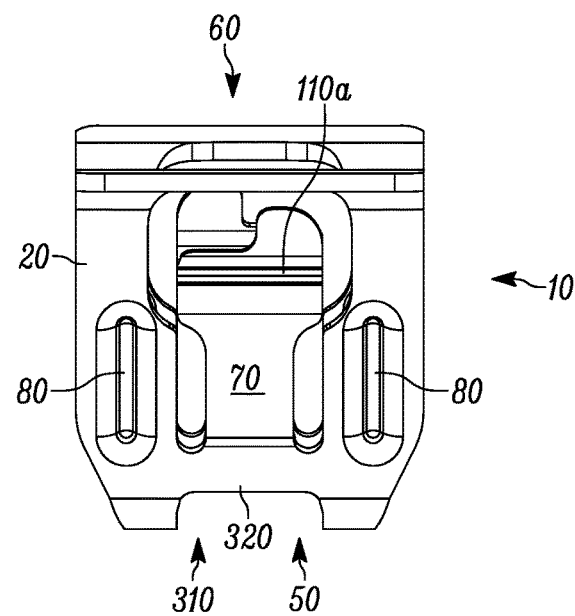
FIG. 3 illustrates another side view of the fastener shown in FIG. 2 rotated 90 degrees.

As shown in FIG. 2, a first engagement spring 70 is connected to the first side 20 in the vicinity of the bottom portion 50. According to one embodiment, the first engagement spring 70 has a first inward facing gusset 80 connected to the bottom portion 50. A second engagement spring 90 is connected to the second side 30 in the vicinity of the bottom portion 50. The second engagement spring 90 has a second inward facing gusset 100.

Gussets 80, 100 stabilize the springs 70, 90 when inserted into a slot 450. In this embodiment the fastener portion 10, 600, 910 does not require attachment to a body panel with a rib 460 but may be supported by one side 940 attached to a sheet metal clip portion 930 as described in more detail below with regard to FIGS. 9-13. The gussets 80, 100 resist springs 70, 90 from compressing excessively and to prevent springs 70, 90 from collapsing so as to maintain the requisite level of springing and engagement. The inward facing gussets 80, 100 on the engagement springs resist the sides 20, 30 from compressing toward each other. The gussets 80, 100 support the sides 20, 30 to resist collapsing of the sides 20, 30 together so that the springs 70, 90 maintain sufficient springing force to maintain engagement regions 100 in sufficient engagement with chassis 448.

Figure 4:
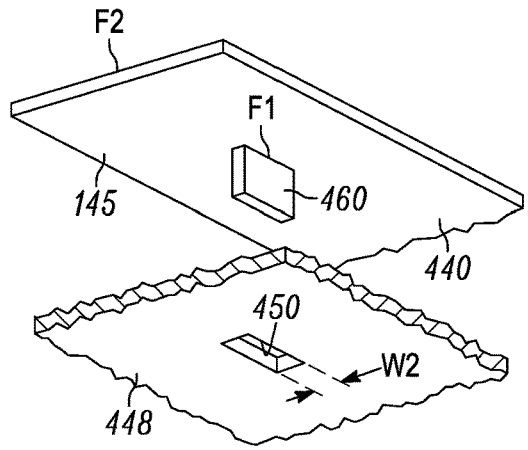
FIG. 4 is an exploded view of a fastener assembly according to one embodiment.
Figure 4B:
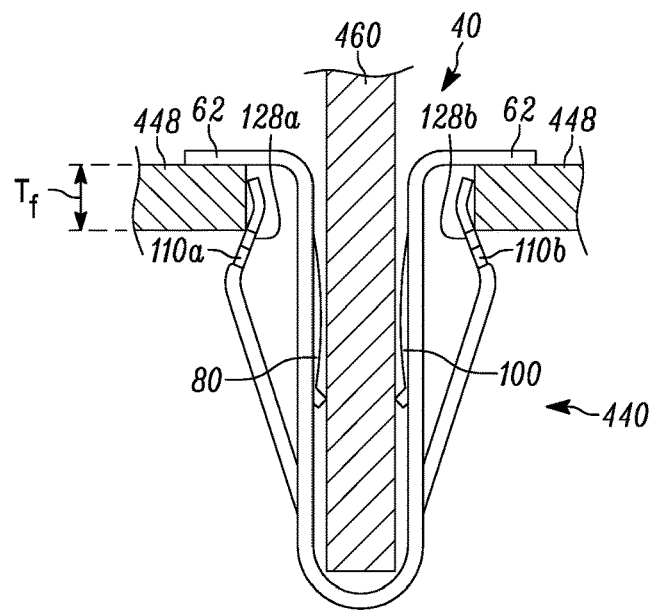
FIG. 4B illustrates a side view of the fastener clip, engaged into a chassis.
Figure 4A:
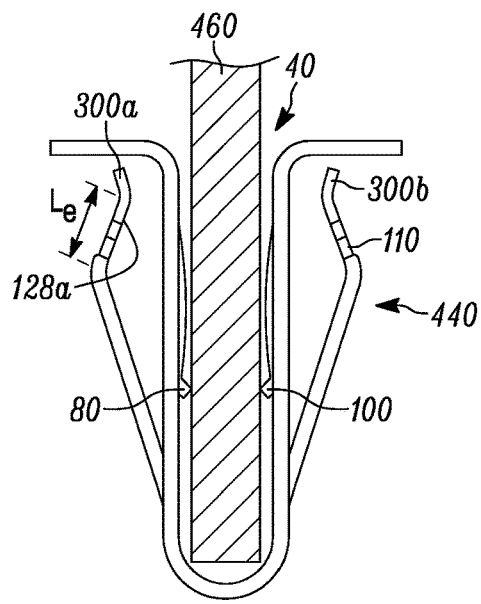
FIG. 4A illustrates a side view of a fastener clip and body panel assembly according to an embodiment.
Figure 4C:
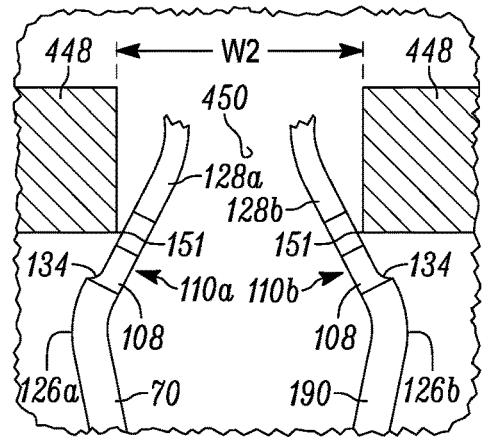
FIG. 4C illustrates a detailed view of the engagement portions of the fastener according to an embodiment.
Figure 4D:
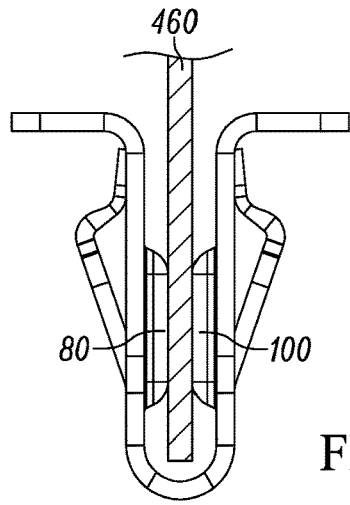
FIG. 4D illustrates a detailed view of the engagement portions of the fastener according to another embodiment.

As shown in FIGS. 4B and 4C, alternatively, fastener 10 may accept a rib 460 attached to a body panel F2 which stabilize the springs 70, 90. Accordingly, springs 70, 90 retain their retention force either via gussets 80, 100 or via rib 460 to provide durable and reliable fastening even when the fastener 10 is inserted into a slot 450 of a chassis 448 for a long period of time.

Numerals referring to the first side 20 contain the letter "a", while numerals referring the second side 30 contain the letter "b". The same numerals without the letters "a" or "b" refer collectively to the respective elements of both sides. The engagement springs 70, 90 include engagement regions 110a, 110b respectively and are operable to adapt to vibrations, variations or movement of a slot 450. The engagement regions 110 include a depressed portion 128 operable to adapt to variations or movement of slot 450.

Each of the first and second engagement springs 70 and 90 may, but not necessarily, have an optional first and second slot retaining tab, 300a and 300b "300", respectively, as shown in FIGS. 1, 3, 4A and 4B. The slot retaining tabs 300 prevent the springs 70, 90 from spreading and passing through slot 450 which would decrease the tension and stability springs 70, 90 provide when inserted and make removal more difficult. According to one embodiment, the slot retaining tabs 300 are half or less than the width of springs 70, 90 and are opposingly keyed. For example, as the springs 70, 90 pass through slot 450 and spring toward each other, the slot retaining tabs 300a, 300b may thus pass each other to allow the springs 70, 90 to compress past each other without colliding, and thus provide a lower insertion force than if the tabs 300 where not correspondingly and opposingly keyed.

Figure 5:
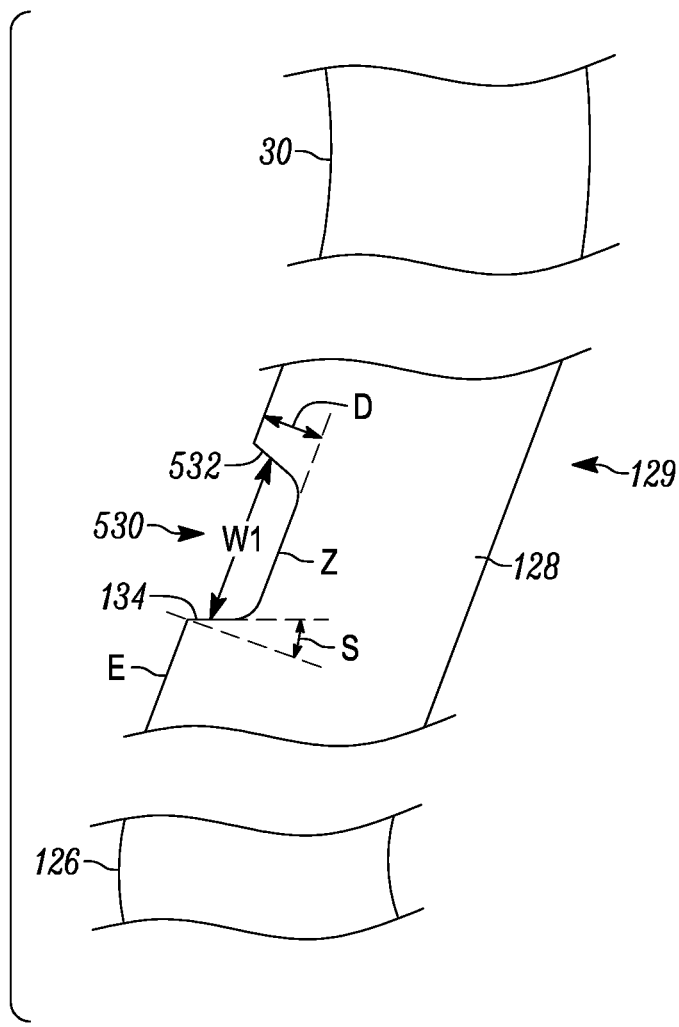
FIG. 5 illustrates a detailed view of the engagement portion of the fastener according to an embodiment.

As shown in FIG. 5, each spring 70, 90 also comprises a first and a second peak, 126a and 126b "126", respectively, and a first and second depressed portion, 128a and 128b "128", respectively. The peaks 126 relate to the amount of compression the springs 70, 90 will collapse (refer to FIG. 4B) when the springs 70, 90 pass slot 450, shown as slot width W2 in FIG. 4C.

The lever/angle pulling force is defined as the force required to separate one part from another part connected with a fastener by pulling said parts apart, not straight away from each other, but sideways from each other. Fastener 10, 400, 600, 900 not only has a low insertion to removal ratio, but also maintains the required removal force and lever/angle pulling force.

According to one embodiment the depressed portion 128, further comprise a first and second hindrance portion, 129, between the peak 126 and the tabs 300. The hindrance 129 portion may be any structure suitable to provide the desired engagement. retention and/or extraction lever/angle force. For example, the hindrance portion 129 may be a depression, ripple, side rib, upward solid bent extension parallel to the peak, knurled region, bent teeth, each having a depth, a bump, an abrupt edge, a gradual angled edge, a curve, a single angled edge, a discrete multi-angled edge, a protrusion, prong, edge, rounded, bulb, stepped, angled, dimple, and a combination thereof.

The hindrance portions 129 provide increased removal force according to the specific structure, dimensions and configuration in the hindrance portion 129, when the fastener 10 is pulled out of the slot 450. Some examples are provided below. As stated above, the slot 450 has a slot width W2 (FIGS. 4 and 4C) and edges 51 (FIG. 4C) on which edges the engagement regions 110 are engaged. The removal force relates to the frictional engagement, compression and/or tension forces resulting from separating fastener 10 from the slot 450.

The increased removal force is due to the hindrance portions 129, such as the depressions 128 as shown in FIG. 4C, which in this particular embodiment comprise single ripples 530 with only back sides 134, as it will be explained at a later point in more detail. According to one embodiment, the engagement portions 110a and 110b and the hindrance regions 129a and 129b are such that the fastener 10 can be extracted from the slot 450 when pulled by the rib 460 (shown in FIG. 4) or sheet metal portion 930 (shown in FIG. 4) away from slot 450. The engagement portions 110 permit extraction without damage to said fastener 10, and with a higher force than a force required in the absence of the hindrance portions 129a and 129b.

The fastener 10, 400, 600, 900 provides a relatively low level of insertion force while providing a high level of extraction force suitable to maintain attachment of the panel to the chassis.

According to an optional embodiment, within the engagement region, such as in the vicinity of the peaks 126, there may be side-cut sections of triangular shape, or any suitable shape, which render the lever/angle pulling force considerably higher than it would have been in their absence.

For configurations where a body panel F2 has a rib 460 inserted into cavity 40, barbs (bent inwardly) in addition to or in place of gussets 80, 100 may further secure the body panel F2 to the fastener 10.

According to one embodiment, the bottom portion 50 has a notch 310. The notch 310 reduces the amount of spring steel in the bottom portion 50 so as to allow the sides 20, 30 and springs 70, 90 to compress relatively easily while providing ample stability and flexing for the sides 20, 30 and springs 70, 90. The size of the notch 310 affects the spring rates for both sides 20, 30 and springs 70, 90. Accordingly, the notch 310 facilitates the easy insertion and high removal forces for the fastener 10, 400, 600, 900 into the slot 450.

Bottom portion 50 further has a bridge 320 below the notch 310 that connects the sides 20, 30 and springs 70, 90. The dimensions and size of bridge 320 may be carefully determined in relation with notch 310 in order to provide the desired amount of flex and stability for sides 20, 30 and springs 70, 90. For example, as springs 70, 90 engage slot 450, the resulting compression forces cause springs 70, 90 to bend, however the resulting torque is transferred through the bridge 320, bottom portion 50 and sides 20, 30. Advantageously, the entire torque path acts as a continuous spring and thus provides a highly controllable and useable modulus of elasticity and very high yield point, especially when compared to any single component.

For example, the modulus of elasticity relates to for example, the size, shape, thickness, width, bend, reinforcement of springs 70, 90 which may be similarly matched to the bridge 320, bottom portion 50 and sides 20, 30. Accordingly, the spring rate for the springs 70, 90 may be similarly matched to the bridge 320, bottom portion 50 and sides 20, 30.

As shown in FIGS. 4 and 4C, an assembly comprises the fastener 10, 400 and a body panel 448 having a slot 450. The slot 450 has a width W2 and edges 151 (FIG. 4C), so that the edges 151 of the slot 450 are engaged to the depressed portion 128a and 128b of the spring fastener 10, 400.

According to one embodiment, a vehicle comprises an assembly as described above.

As illustrated in FIG. 4, according one embodiment, the spring fastener 400 is intended to connect a first part, such as a panel 440 for example, which panel may have a rib 460, with a second part, such as a frame 448 of a car for example, having a slot 450.

According to the embodiment shown in FIG. 4, the rib 460 of the panel 440 is first inserted into the cavity 40 of the fastener 10 (see FIG. 4A), where, it is secured by barbs (bent inwardly) in place of gussets 80, 100. Then, the fastener 10 which has been secured on the rib extension 460 of the panel 44, is inserted into the slot 450 of the frame 448, as better shown in FIG. 4B. However the sequence inserting the fastener may be the opposite.

According to one embodiment, the length Le (see FIG. 4A) of the engagement regions 128 for example may be 2-4 mm, while the thickness Tf ($T_f$) of the chassis or frame 448 (see FIG. 4B) may vary depending on the chassis or frame thickness in the range of 0.5 to 2 mm. This may make it rather difficult to form large hindrance portions. Thus, the "bulbous projections" suggested by U.S. Pat. No. 6,141,837 (Wisniewski) map be suitably spaced between the "reverse bents" (engagement regions between the peak and the recess in the case), and are manufactured within tolerances with regard to the thickness of the frame (which in practice may vary considerably), the "base plates" (top portions in the case).

According to one embodiment, and for ergonomic purposes combined with practical aspects, the force to insert the springs 70, 90 into slot 450 may be less than 40 lbs, less than 15 lbs, and even less that 10 lbs; the force to insert the spring fastener into the slot 450 may be less that 30 lbs, less than 15 lbs, and less than 10 lbs; and the force to extract the spring fastener 10, 400 from the slot 450 should be in the range of 30-100 lbs, and preferably in the range of 50-70 lbs.

According to one embodiment, in order to achieve the above results, the hindrance portions 129 could comprise any suitable structural element sufficient to allow springs 70, 90 to enter slot 450 with low insertion force and a high extraction force. However, structural components may be suitably sized compared to slot size W2 such that these fasteners may be irreversibly inserted into slot 450 from a body panel.

As examples of structures the first and second engagement springs further comprise engagement regions including one structure selected from at least one of: depression 128, ripple 530, side rib, upward solid bent extension parallel to the peak, knurled region, bent teeth, each having a depth, a bump, an abrupt edge, a gradual angled edge, a curve, a single angled edge, a discrete multi-angled edge, a protrusion, prong, edge, rounded, bulb, stepped, angled, dimple, and a combination thereof.

According to one embodiment, the hindrance portions 29a and 29b may comprise minute elements, such as ripple (s) 530, upward solid bent extensions parallel to the peaks 126 and the recesses, knurled regions, bent teeth, each having a depth, the depth of which according to one embodiment is about 0.2 mm, or 0.1 mm or any suitable depth.

The depth for any element substantially depends on the dimensions of the required springs and sides in a similar manner as for the ripples 530 such that the extraction force is greater than the insertion force.

As shown in FIGS. 5, 5A, 5B, 5C, 5D, and 5E, according to one embodiment the fastener 10, 400, 600, 900 includes any suitable structure, such as for example upward solid bent extensions parallel to the peaks and the recesses, knurled regions, and bent teeth. Some structures are described in at least one of: the provisional patent applications: 60/301,364, filed Jun. 25, 2001, 60/327,814, filed Oct. 9, 2001, 60/353,515, filed Feb. 1, 2002, U.S. Pat. Nos. 6,718,599 B2, and 6,745,440 B2, all of which are incorporated herein by reference. According to one embodiment, their depth D may be approximately 0.2 mm or any suitable depth. For example, depression 128 (FIGS. 5A and 5B) may have a depth range from about 0.2 mm, to 0.1 mm. According to one embodiment the hindrance portion comprises one ripple (FIG. 5C), two ripples (FIG. 5D), three (FIG. 5E), four, and even more ripples. Structures with one to three two-sided ripples 530 on sides 20, 30, 620, 622 or springs 70, 90, 670, 690 or any suitable number may adapt to different distances between the body panel 440, 1440 and chassis 448.

According to one embodiment each ripple 530 is in the form of a depression 128, as shown in FIGS. 5 and 5A through 5E. The depression 128 has a depth D, and height Z, a front side 532, a back side 134, and a width W1. The hindrance portion 129 has a surface E. The depth D of each ripple 530 is the distance between the surface E of the hindrance portion 129 and the deepest part Z of the respective ripple 530.

According to one embodiment, the ripple width W1 is larger than the depth D of the ripple 530, and preferably the ripple width W1 is at least twice the size of the depth of the ripple 530. The ripple width W1 for example may be in the range of 0.1 to 0.5 mm and the ripple depth D is in the range of 0.01 to 0.1 mm.

According to one embodiment, the back side 134 of the ripple 530 is substantially linear or alternatively or in combination has a curvature or slope S (for example in the range of 15 to 30 degrees) with regard to the general plane of the surface E of the hindrance portion 129. To facilitate insertion and to resist over-insertion, the front side 532 has a higher slope than the back side 134. The slope or angle A1 shown in FIG. 5A of the front side 532 is measured in a similar manner as the slope S of the back side 134. Thus, if the front side 532 is substantially perpendicular to the surface E, the slope or angle A1 is substantially 90 degrees, while if the front side 532 is substantially parallel to the plane of surface E and the continuation of the deepest part Z, the slope or angle A1 is substantially 0 degrees.

Figure 5A:
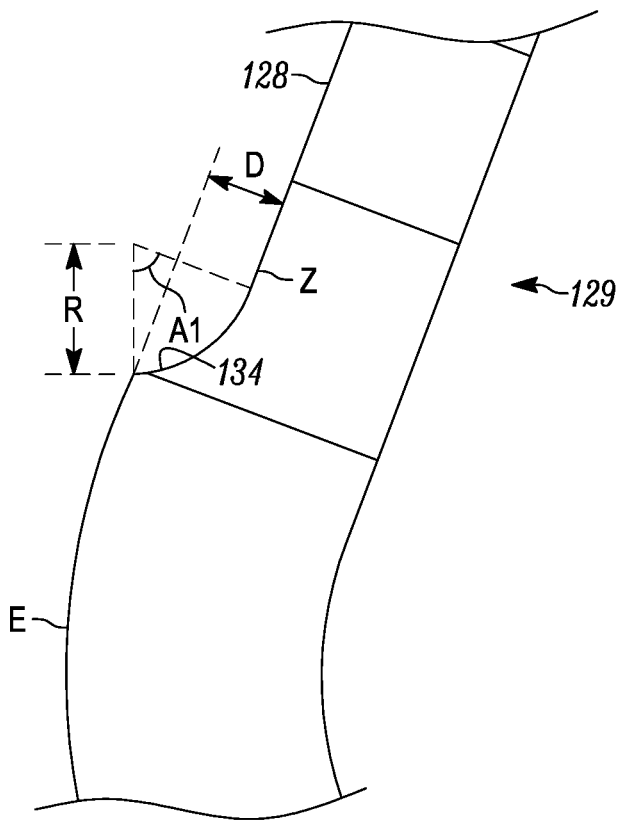
FIG. 5A illustrates a detailed view of the engagement portion of the fastener according to another embodiment.

As shown in the embodiment shown in FIG. 5A, the back side 134 has the form of a curvature with a gradually decreasing slope. For example, the gradually decreasing slope of back side 134 may have the shape of an arc corresponding to an angle A1, substantially in the range of 50-70 degrees, with a radius R, substantially in the range of 0.03-0.05 mm.

The fastener clip 10, 400, 600, 900 dampens vibrations and thus eliminates or substantially reduces buzz, squeak and rattles. For example, vibrations are compensated because the edges 151 of the slot 450 (FIG. 4C) frictionally slide back and forth on the engagement regions 128 as well as the hindrance portions 129 shown in FIG. 5A during engagement. When edges 151 reach the back sides 134 of the single-sided ripple(s) 530 (FIG. 5A), edges 151 continue fractionally sliding finding increasingly higher resistance in a continuous manner, which reduces or eliminates rattling noises. Such rattling noises would be present in a case that the edges 151 would hit abrupt hindrances 129 or would suddenly jump down, even without hitting such hindrances 129.

The engagement regions 110 may have an area greater than the area of the depression 128, so that the edge 151 may be able to compensate for movement and motion displacement in the event of excessive production tolerances or vibration.

Figure 6A:
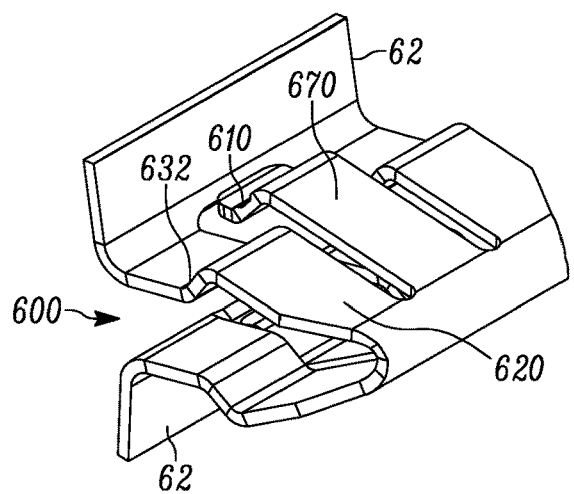
FIG. 6A illustrate a perspective and two side views of a fastener according to another embodiment.
Figure 6:
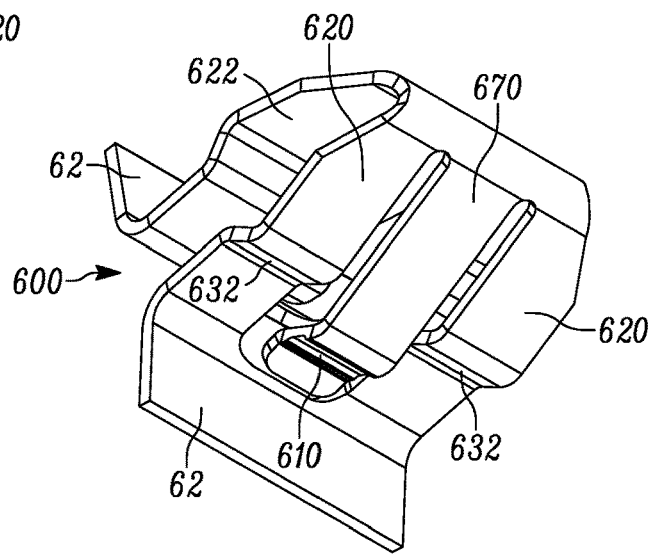
FIG. 6 illustrate a perspective and two side views of a fastener according to another embodiment.
Figure 7:
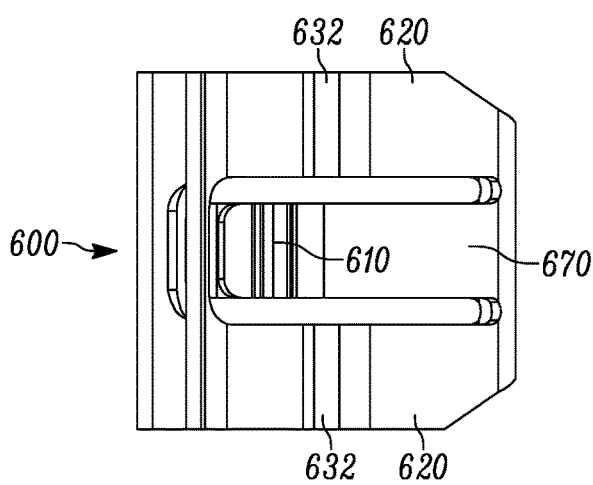
FIG. 7 illustrate a perspective and two side views of a fastener according to another embodiment.
Figure 8:
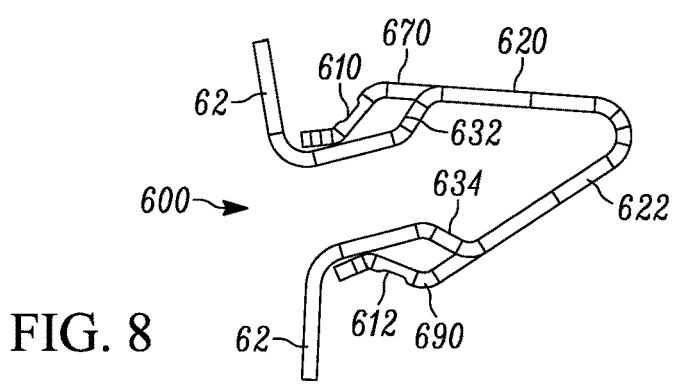
FIG. 8 illustrate a perspective and two side views of a fastener according to another embodiment.

FIGS. 6-8 illustrate a perspective and two side views of a fastener 600 according to another embodiment having engagement regions 610, 612, on springs 670, 690 and engagement regions 632 on sides 620, 622. The fastener 600 may have engagement regions 610, 612 on both the first spring 670 and second springs 690 as well as engagement regions 632, 634 on the first sides 620 and second sides 630 respectively and thus the fastener 600 engages the slot 450 in a total of up to six engagement regions. Alternatively, the spring fasteners 10, 400, 600, 900 may have two engagement regions 110 such as ripples 530 as shown in side 620, 622 FIGS. 5D and 5E instead of one engagement region. This way, the same fastener 10, 400, 600, 900 may fasten panels at two or more distances from the chassis.

As shown in FIGS. 6-8, the range of engagement between for example, the body panel 448 and chassis 440, or if the thickness of body panel 448 varies by application or vehicle platform, then the engagement regions can be stacked or combined together in order to provide a very long engagement region between the sides and the springs. Each spring 610, 612 and side 620, 622 may have over lapping or non overlapping engagement regions such as 610 with 632 and 612 with 634. For example, the thickness of body panel 448 may be thinner "thin" for one application and thicker "thick" for the other. If thick, as the fastener 600 is inserted into slot 450, sides 620, 622 for example, engage slot 450 at engagement regions 632, 634 and as a result sides 620, 622 spring back out while springs 670, 690 stay compressed. The thick body panel 448 is wedged between engagement regions 632, 634 and feet 62 and stays secured to fastener 600. If the fastener 600 is inserted into a thin body panel 448 with slot 450, then sides 620, 622 as well as springs 670, 690 spring back out. springs 670, 690 engage slot at engagement regions 610, 612. The thin body panel 448 is wedged between engagement regions 610, 612 and feet 62 and stays secured to fastener 600. Thus fastener 600 is easily inserted to and securely engages both thin and thick body panels 448 and a range of thicknesses.

If the sides 620, 622 provide engagement to for example a thick panel 448, then the slot 450 engages each side 620, 622 at four regions, 632, 634 corresponding to each side element respectively. If the springs 670, 690 engage a thin panel 448, then the two springs 670, 690 provide two points of engagement 610, 612. Alternatively, the springs 670, 690 may overlap with the sides 620, 630 then six points of engagement are possible, and so forth depending on the panel 448 thickness (for example middle thickness between thin and thick) or on the relative positions of engagement regions 610, 612 and 632, 634.

Figure 9:
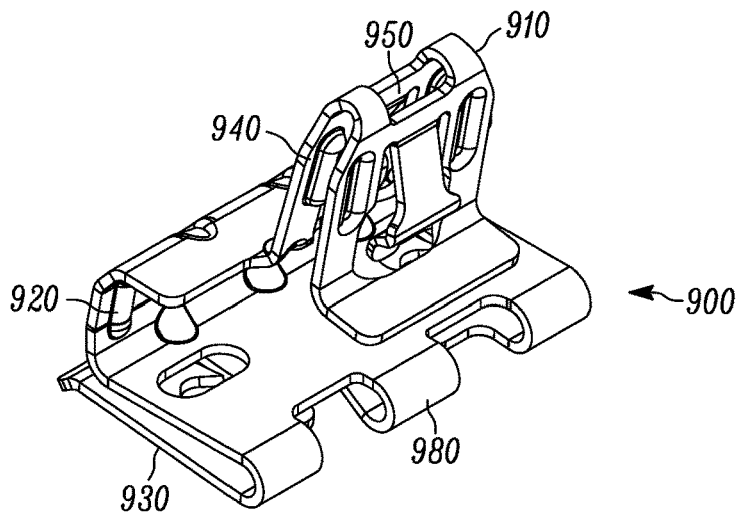
FIG. 9 illustrates a transverse mounted fastener according to another embodiment.

FIG. 9 illustrates a transverse mounted fastener 900 according to another embodiment. The transverse mounted fastener 900 has a fastener portion 910 similar to fasteners 10, 400, and alternatively fastener 600 as previously described. The transverse mounted fastener 900 has a U channel 920, and a sheet metal clip 930 portion coupled to the U channel 920. The U channel 920 is coupled to the first side 940 of fastener portion 910, opposite the bottom portion 950.

Figure 10:
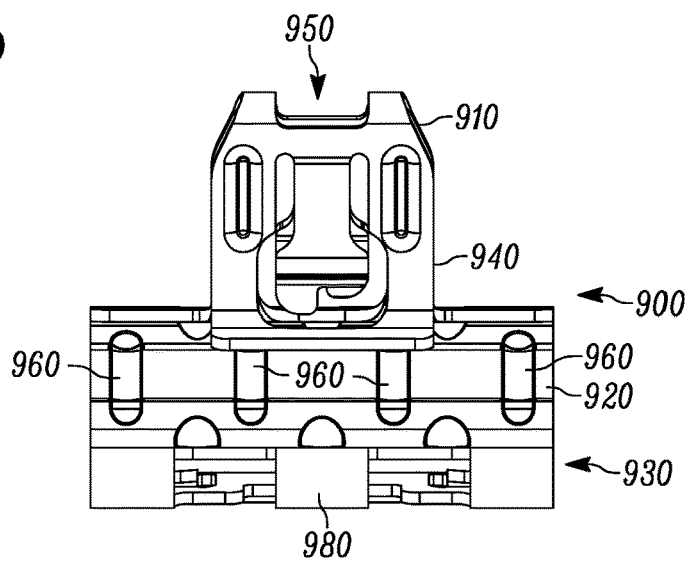
FIG. 10 show two side views of the transverse mounted fastener.
Figure 11:
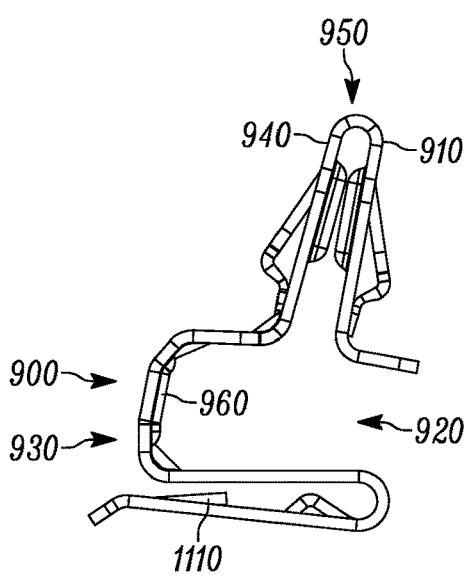
FIG. 11 show two side views of the transverse mounted fastener.

FIGS. 10-11 show two side views of the transverse mounted fastener 900. Strengthening gussets 960 formed on the U channel 920 strengthen the U channel 920 to resist torquing or bending of the U channel 920. The strengthening gussets 960 for example firmly grip door panel 1440.

Figure 12:
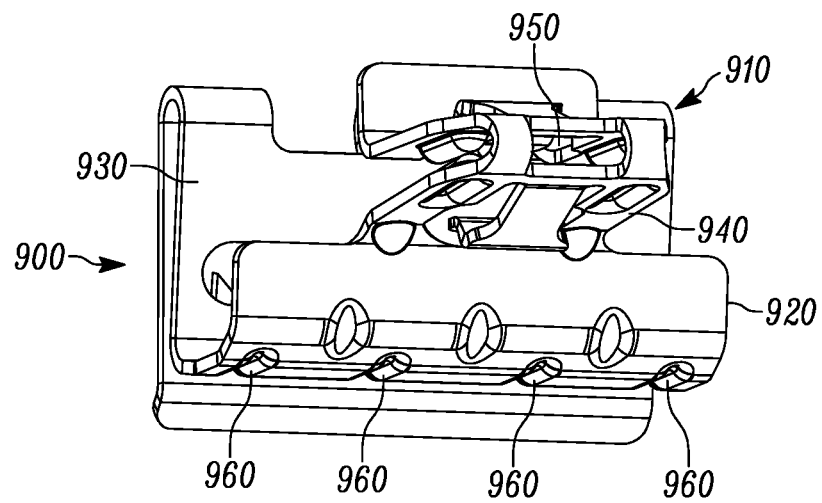
FIG. 12 illustrates bottom and top views respectively of the transverse mounted fastener according to another embodiment.
Figure 13:
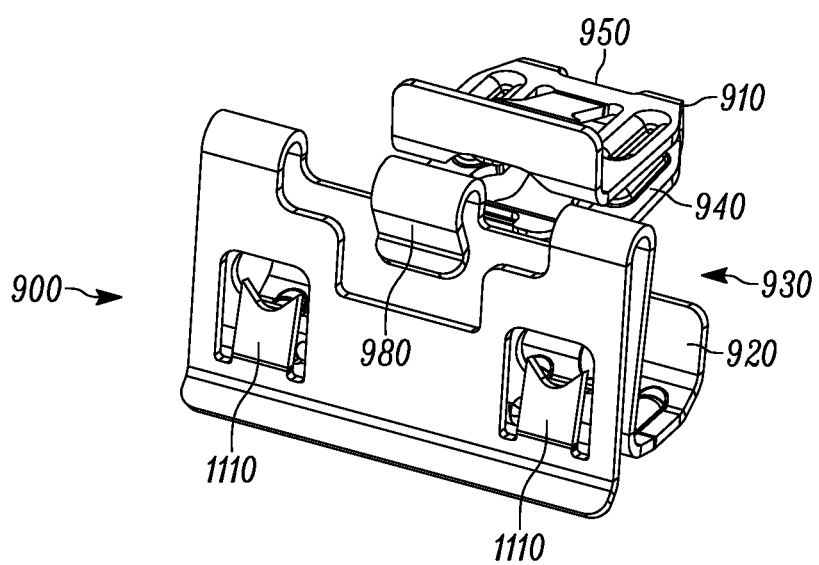
FIG. 13 illustrates bottom and top views respectively of the transverse mounted fastener according to another embodiment.

FIGS. 12-13 illustrates bottom and top views respectively of the transverse mounted fastener 900 according to another embodiment. V barbs 1110 on an end of the sheet metal clip portion 930 on an end opposite the U channel 920. V barbs 1110 dig into sheet metal 1140 to resist extraction and enhance retention of the sheet metal clip portion 930. Stabilizer tab 980 is formed on a mid portion of the sheet metal clip portion 930. For example, stabilizer tab 980 resists or prevents rocking of the sheet metal clip portion 930 by further gripping chassis or frame 1440 such as a door frame.

Figure 14:
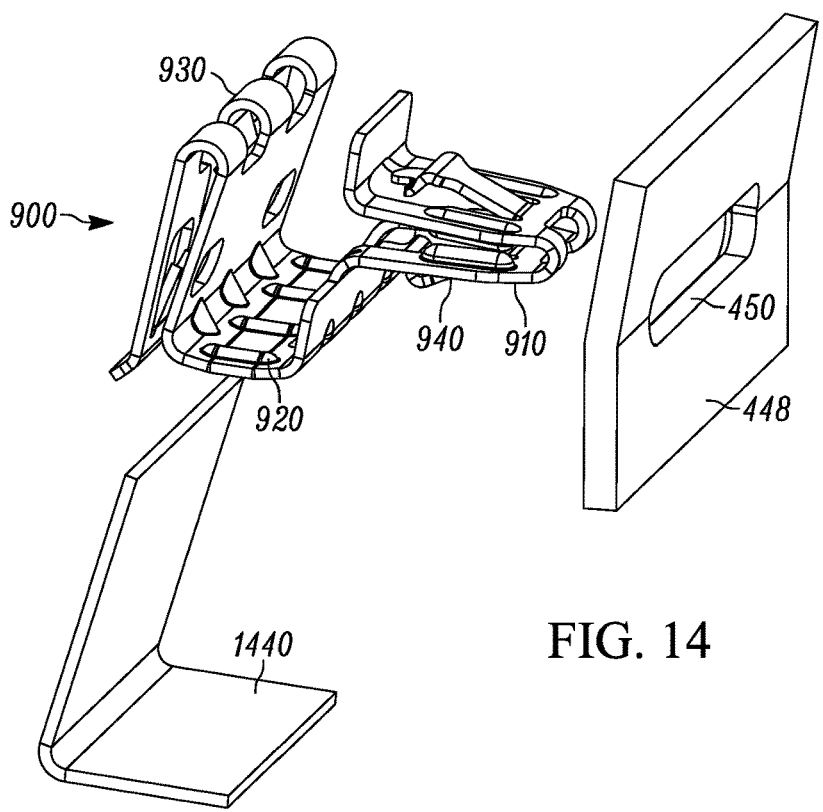
FIG. 14 is an exploded view of the transverse mounted fastener shown in FIG. 9, sheet metal mount and body panel.

FIG. 14 is an exploded view of an assembly comprising the transverse mounted fastener 900, sheet metal mount 1440 and body panel 448. For example, the sheet metal clip portion 930 clips onto a door frame 1140. A door panel 448 having a slot 450 may then attach to the fastener portion 910. The door panel 448 may have a gasket or window glass seal that fits in and fills into U channel 920.

Figure 15:
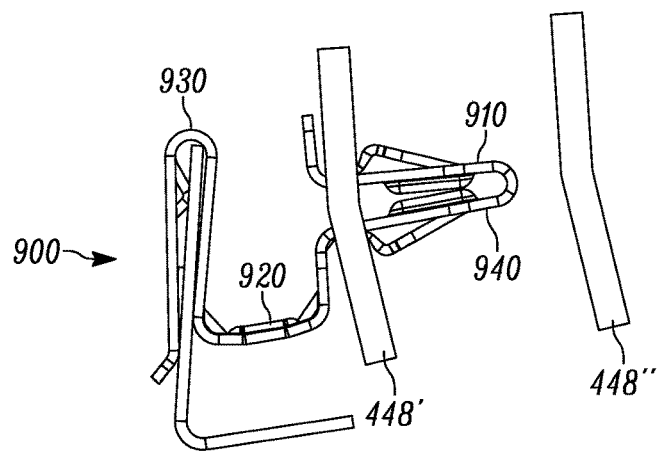
FIGS. 15 and 16 are side and perspective views of the transverse mounted fastener, sheet metal mount and body panel shown before and after mounting to a body panel.
Figure 16:
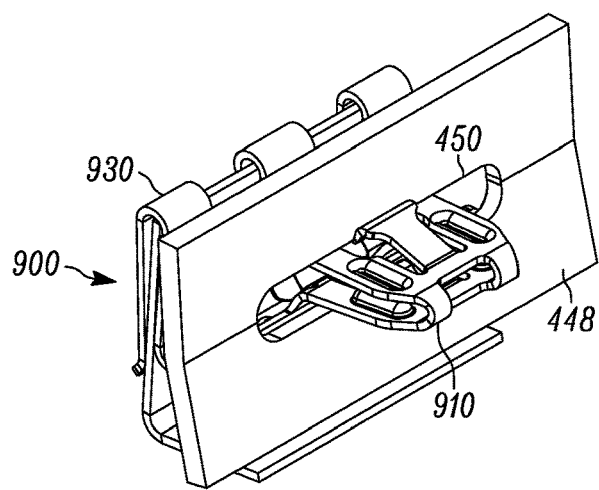

FIGS. 15 and 16 are side and perspective views of the assembly including the transverse mounted fastener 900, sheet metal mount 1440 and body panel 448 shown before mounting to a body panel 448" and after mounting to a body panel 448'.

Body panel 448 may for example include plastic trim, a pull handle, window seals and other components. The transverse mounted fastener 900 may be fastened to the body panel 448 and delivered as a body panel and fastener assembly to a final assembly factory. Since the body panel 448 has the transverse mounted fastener(s) 900 already attached, then the assembly is ready for attachment to the door frame 1440.

For example, the body panel and fastener assembly may easily be attached by inserting the sheet metal clip portion 930 onto to the door frame 1440 and any other attachment points.

The transverse mounted fastener 900 may be manufactured from spring steel using multi step and or multi slide stamping processes. Alternatively the transverse mounted fastener 900 may be manufactured from aluminum, magnesium, plastic, or any other suitable material.

The spring fastener 10, 400, 600, 900 may optionally comprise a molded elastic body of said spring fastener 10, 400, 600, 900. Such arrangements are disclosed in U.S. Pat. No. 6,353,981 B1, which is incorporated herein by reference.

The operation of this embodiment is similar to the operation of the previously described embodiments with the difference that the elastic body provides moderate sealing properties to the fastener when the fastener is inserted into the slot.

As shown in FIGS. 15-19, the fastener 10 comprises a first side 12 connected to a bottom portion 16 and a second side 14 connected to the bottom portion 16, thereby forming a U-shaped structure with the first side 12. A first engagement spring 20a is connected to the bottom portion 16 and a second engagement spring 20b is connected to the bottom portion 16. The fastener 10 is also suitable to be engaged reversibly in a slot 50 of second part 48, such as a metal sheet and/or the frame of a car.

The fastener may also have a coating made of at least one of: Polypropylene, glass fill, acetyl, plastic, vinyl, rubber, plastisol, plastic, acetyl, polyacetal, polyoxymethylene, nylon, any suitable polymeric material, polycarbonate, thermoplastic resin, fiberglass and carbon fiber and Acrylonitrile butadiene styrene (ABS), or any suitable material and combination thereof. The coating may be suitable for injection molding.

The implementation of other variations and modifications of the present invention in its various aspects will be apparent to those of ordinary skill in the art and that the invention is not limited by the specific embodiments described. It is therefore contemplated to cover by the present invention any and all modifications, variations, or equivalents embodiments of fasteners described above and their equivalents may be used in any assembly of the fastener, as well as in any vehicle comprising such an assembly or such a fastener or its equivalents that fall within the spirit and scope of the basic underlying principles disclosed and claimed herein.

What is claimed is:

1. A fastener comprising:
   a bottom portion;
   a first side having an inward facing gusset connected to the bottom portion;
   a second side having an inward facing gusset connected to the bottom portion, thereby forming a U-shaped structure with the first side;
   wherein the first side inward facing gusset engages the second side inward facing gusset when at rest;
   a first engagement spring connected to the bottom portion;
   a second engagement spring connected to the bottom portion; and
   each of the first and second engagement springs comprising a peak and a free end;
   at least one of said engagement spring having two spring sides and a side-cut on each spring side, the side-cuts being across each other, thus forming a side-cut section aligned to be substantially parallel to the peak, each side-cut including an upper edge and a lower edge.

2. A fastener as in claim 1, wherein the first side further comprises at least one first side engagement region between the peak and the free end, and the second side further comprises at least one second side engagement region between the peak and the free end.

3. A fastener as defined in claim 1, wherein the first and second engagement springs further comprise engagement regions including one structure selected from at least one of: depression, ripple, side rib, upward solid bent extension parallel to the peak, knurled region, bent teeth, each having a depth, a bump, an abrupt edge, a gradual angled edge, a curve, a single angled edge, a discrete multi-angled edge, a protrusion, prong, edge, rounded, bulb, stepped, angled, dimple, and a combination thereof.

4. A fastener as in claim 1, wherein each engagement spring further-comprises:
   a first slot retaining tab at the end on the first engagement spring opposite the bottom portion; and
   a second slot retaining tab at the end on the second engagement spring opposite the bottom portion.

5. A fastener as defined in claim 1, further including inward barbs in addition to the gussets on the first side and second side to engage a rib.

6. A fastener as defined in claim 1, wherein the bottom portion has a notch so as to match a spring rate for at least one of: a bridge, bottom portion, sides and springs.

7. A fastener as defined in claim 1, further comprising:
   a U channel coupled to the first side, opposite the bottom portion; and a sheet metal clip portion coupled to the U channel.

8. A fastener as defined in claim 7, wherein the sheet metal clip further comprises at least one of: strengthening gussets formed on the U channel, V barbs on an end of the sheet metal clip portion on an end opposite the U channel, and stabilizer tabs formed on a mid portion of the sheet metal clip.

9. An assembly of a first part comprising a body panel and a fastener, the fastener comprising
   a bottom portion;
   a first side having an inward facing gusset connected to the bottom portion;
   a second side having an inward facing gusset connected to the bottom portion, thereby forming a U-shaped structure with the first side;
   wherein the first side inward facing gusset engages the second side inward facing gusset when at rest;
   a first engagement spring connected to the bottom portion;
   a second engagement spring connected to the bottom portion; and
   each of the first and second engagement springs comprising a peak and a free end;
   at least one engagement spring having two spring sides and a side-cut on each spring side, the side-cuts being across each other, thus forming a side-cut section aligned to be substantially parallel to the peak, each side-cut including an upper edge and a lower edge.

10. A fastener as defined in claim 9, wherein the first side further comprises at least one first side engagement region between the peak and the free end, and the second side further comprises at least one second side engagement region between the peak and the free end; wherein the side-cut section have an upper edge and a lower edge.

11. A fastener as defined in claim 9, wherein the first and second engagement springs further comprise engagement regions including one structure selected from at least one of: depression, ripple, side rib, upward solid bent extension parallel to the peak, knurled region, bent teeth, each having a depth, a bump, an abrupt edge, a gradual angled edge, a curve, a single angled edge, a discrete multi-angled edge, a protrusion, prong, edge, rounded, bulb, stepped, angled, dimple, and a combination thereof.

12. A spring fastener as defined in claim 9, wherein each engagement spring further comprises:
   a first slot retaining tab at the end on the first engagement spring opposite the bottom portion; and
   a second slot retaining tab at the end on the second engagement spring opposite the bottom portion.

13. A spring fastener as defined in claim 9, further including inward barbs in addition to the gussets on the first side and second side to engage a rib.

14. A spring fastener as defined in claim 9, further comprising:
   a U channel coupled to the first side, opposite the bottom portion; and
   a sheet metal clip portion coupled to the U channel.

15. A fastener as defined in claim 14, wherein the sheet metal clip further comprises at least one of: strengthening gussets formed on the U channel, V barbs on an end of the sheet metal clip portion on an end opposite the U channel, and stabilizer tabs formed on a mid portion of the sheet metal clip.

16. A vehicle comprising parts connected with a fastener, the fastener comprising:
   a bottom portion;
   a first side having an inward facing gusset connected to the bottom portion;
   a second side having an inward facing gusset connected to the bottom portion, thereby forming a U-shaped structure with the first side;
   wherein the first side inward facing gusset engages the second side inward facing gusset when at rest;
   a first engagement spring connected to the bottom portion;
   a second engagement spring connected to the bottom portion;
   each of the first and second engagement springs comprising a peak and a free end;
   at least one of said engagement spring having two spring sides and a side-cut on each spring side, the side-cuts being across each other, thus forming a side-cut section aligned to be substantially parallel to the peak, each side-cut including an upper edge and a lower edge.

17. A spring fastener as defined in claim 16, wherein at least one of: the first side, the second side, the first engagement spring, and the second engagement spring further comprises one structure selected from at least one: depression, ripple, side rib, upward solid bent extension parallel to the peak, knurled region, bent teeth, each having a depth, a bump, an abrupt edge, a gradual angled edge, a curve, a single angled edge, a discrete multi-angled edge, a protrusion, prong, edge, rounded, bulb, stepped, angled, dimple, and a combination thereof.

18. A spring fastener as defined in claim 16, further including inward barbs in addition to the gussets on the first side and second side to engage a rib.

19. A spring fastener as defined in claim 16, further comprising:
   a U channel coupled to the first side, opposite the bottom portion; and
   a sheet metal clip portion coupled to the U channel.

20. A spring fastener as defined in claim 19, wherein the sheet metal clip further comprises at least one of: strengthening gussets formed on the U channel, V barbs on an end of the sheet metal clip portion on an end opposite the U channel, and stabilizer tabs formed on a mid portion of the sheet metal clip.

21. A fastener comprising:
   a bottom portion;
   a first side having an inward facing gusset connected to the bottom portion;
   a second side having an inward facing gusset connected to the bottom portion, thereby forming a U-shaped structure with the first side;
   wherein the first side inward facing gusset engages and stabilizes the second side inward facing gusset in a vicinity of the bottom portion when at rest;
   a first engagement spring connected to the bottom portion;
   a second engagement spring connected to the bottom portion; and
   each of the first and second engagement springs comprising a peak and a free end;
   at least one of said engagement spring having two spring sides and a side-cut on each spring side, the side-cuts being across each other, thus forming a side-cut section aligned to be substantially parallel to the peak, each side-cut including an upper edge and a lower edge.

22. The fastener of claim 21 wherein the gussets engage to support the sides to resist collapsing of the sides together so that the engagement springs maintain springing force to maintain engagement of the engagement springs.

23. The fastener of claim 21 wherein the gussets engage a rib to resist collapsing of the sides together so that the engagement springs maintain springing force to maintain engagement of the engagement springs.

24. A spring fastener comprising a first side and a second side opposite the first side, the first side connected to the second side thereby forming a U-shaped structure having a cavity between the first side and the second side, a bottom portion wherein the first side and the second side are connected, and a top portion, the first side comprising a first engagement spring, the first engagement spring connected to the first side in the vicinity of the bottom portion, the second side comprising a second engagement spring, the second engagement spring connected to the second side in the vicinity of the bottom portion, each of the first and second engagement springs comprising a peak, a free end, and an engagement region between the peak and the free end, at least one engagement spring having two spring sides and a side-cut on each spring side, the side-cuts being across each other, thus forming a side-cut section aligned to be substantially parallel to the peak, each side-cut including an upper edge and a lower edge;

wherein the first side has an inward facing gusset; and the second side has an inward facing gusset wherein the first side inward facing gusset engages the second side inward facing gusset when at rest.

* * * * *